United States Patent
Sudo

(10) Patent No.: US 9,298,364 B2
(45) Date of Patent: Mar. 29, 2016

(54) MOBILE ELECTRONIC DEVICE, SCREEN CONTROL METHOD, AND STORAGE MEDIUM STRONG SCREEN CONTROL PROGRAM

(75) Inventor: Tomohiro Sudo, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 616 days.

(21) Appl. No.: 13/304,449

(22) Filed: Nov. 25, 2011

(65) Prior Publication Data

US 2012/0137258 A1 May 31, 2012

(30) Foreign Application Priority Data

Nov. 26, 2010 (JP) ................... 2010-264396

(51) Int. Cl.
*G06F 3/01* (2006.01)
*G06F 3/0488* (2013.01)
*G06F 3/0486* (2013.01)

(52) U.S. Cl.
CPC .......... *G06F 3/04883* (2013.01); *G06F 3/0486* (2013.01)

(58) Field of Classification Search
CPC ... G06F 3/017; G06F 3/0488; G06F 3/04883; G06F 2203/04808; G06F 3/041; G06F 3/0485; G06F 3/0482; G06F 3/04842
USPC .......................................... 715/863; 345/173
See application file for complete search history.

(56) References Cited

U.S. PATENT DOCUMENTS

| | | | | |
|---|---|---|---|---|
| 8,781,398 B2 * | 7/2014 | Konded | ............... | G06F 3/04883 455/41.2 |
| 2006/0026535 A1 * | 2/2006 | Hotelling | ............... | G06F 3/0418 715/863 |
| 2006/0058616 A1 * | 3/2006 | Marquart | ........... | A61B 19/5244 600/407 |
| 2007/0146337 A1 * | 6/2007 | Ording | .................. | G06F 3/0485 345/173 |
| 2009/0140058 A1 * | 6/2009 | Koster | .................. | F24F 11/006 236/49.3 |
| 2009/0143880 A1 * | 6/2009 | Amundson | ......... | F24F 11/0086 700/83 |
| 2009/0199130 A1 * | 8/2009 | Tsern | ..................... | G04G 21/08 715/810 |
| 2009/0228842 A1 * | 9/2009 | Westerman | ......... | G06F 3/04883 715/863 |
| 2009/0241072 A1 * | 9/2009 | Chaudhri | ............ | G06F 3/04883 715/863 |
| 2009/0254854 A1 * | 10/2009 | Adams | .................... | G06F 3/048 715/800 |
| 2009/0278806 A1 * | 11/2009 | Duarte | .................. | G06F 3/0416 345/173 |
| 2010/0083190 A1 * | 4/2010 | Roberts | ............... | G06F 3/04883 715/863 |

(Continued)

FOREIGN PATENT DOCUMENTS

| | | |
|---|---|---|
| JP | 7160428 A | 6/1995 |
| JP | 11224163 A | 8/1999 |

(Continued)

OTHER PUBLICATIONS

Your HTC Desire User Guide_May 2010, pp. 1-211.*

(Continued)

*Primary Examiner* — Stephen Hong
*Assistant Examiner* — Ahamed I Nazar
(74) *Attorney, Agent, or Firm* — Hauptman Ham, LLP

(57) ABSTRACT

According to an aspect, a mobile electronic device includes a touch panel and a control unit. The touch panel displays a screen thereon and detects a gesture performed on a surface thereof. When a sweep gesture is detected by the touch panel, the control unit cause an object corresponding to a process, which is executable while the screen is displayed on the touch panel, to be displayed near a position where the sweep gesture is detected on the touch panel.

14 Claims, 11 Drawing Sheets

(56) References Cited

U.S. PATENT DOCUMENTS

| | | | | |
|---|---|---|---|---|
| 2010/0156656 A1* | 6/2010 | Duarte | G06F 3/04886 | 340/815.4 |
| 2010/0223574 A1* | 9/2010 | Wang | G06F 3/0485 | 715/778 |
| 2010/0285845 A1* | 11/2010 | Sawada | H04M 1/0245 | 455/566 |
| 2010/0302172 A1* | 12/2010 | Wilairat | G06F 3/04883 | 345/173 |
| 2011/0003621 A1* | 1/2011 | Atsumi | H04W 52/0254 | 455/566 |
| 2011/0126156 A1* | 5/2011 | Krishnaraj | G06F 3/016 | 715/828 |
| 2011/0161852 A1* | 6/2011 | Vainio | G06F 3/04842 | 715/769 |
| 2011/0164058 A1* | 7/2011 | Lemay | G06F 3/0488 | 345/651 |
| 2011/0304584 A1* | 12/2011 | Hwang | G06F 3/04845 | 345/174 |
| 2011/0307481 A1* | 12/2011 | Leite | G06Q 30/0256 | 707/728 |
| 2012/0131500 A1* | 5/2012 | Fujisawa | G06F 3/04817 | 715/800 |
| 2012/0137258 A1* | 5/2012 | Sudo | G06F 3/04883 | 715/863 |
| 2012/0147055 A1* | 6/2012 | Pallakoff | G06F 3/0483 | 345/672 |
| 2012/0154303 A1* | 6/2012 | Lazaridis | G06F 1/3203 | 345/173 |
| 2012/0327121 A1* | 12/2012 | Dhawade | G06F 3/04883 | 345/649 |
| 2013/0019169 A1* | 1/2013 | Bastide | G06F 17/273 | 715/257 |
| 2013/0050125 A1* | 2/2013 | Sudo | G06F 3/04886 | 345/173 |
| 2013/0073287 A1* | 3/2013 | Beckley | G09B 5/04 | 704/260 |

FOREIGN PATENT DOCUMENTS

| | | |
|---|---|---|
| JP | 2004303207 A | 10/2004 |
| JP | 2009110286 A | 5/2009 |
| JP | 2009-164794 A | 7/2009 |

OTHER PUBLICATIONS

J-Phone, How to use SBSettings, published Apr. 2010, pp. 1-6.*
Office Action mailed Apr. 30, 2014, corresponds to Japanese patent application No. 2010-264396, for which an explanation of relevance is attached.

* cited by examiner

FIG.3
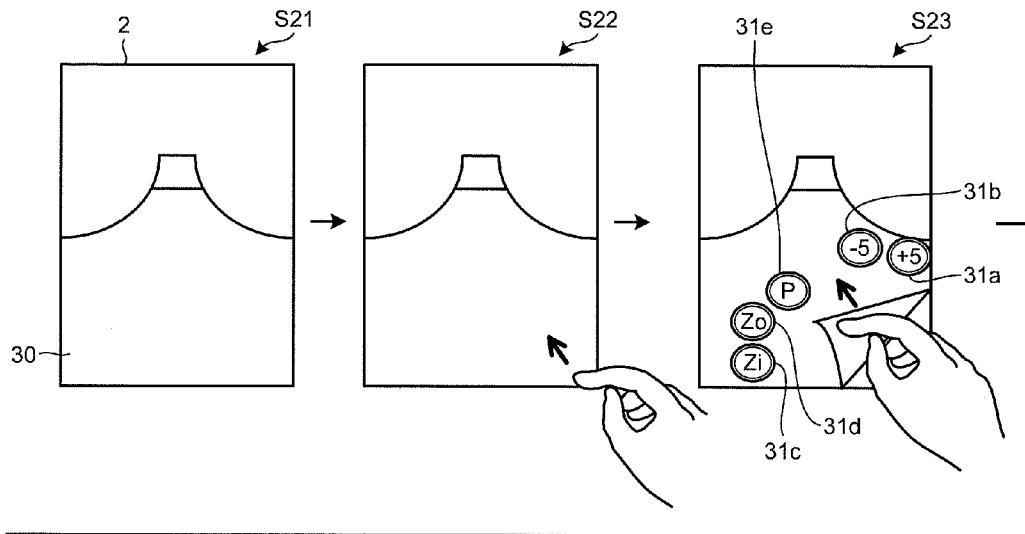
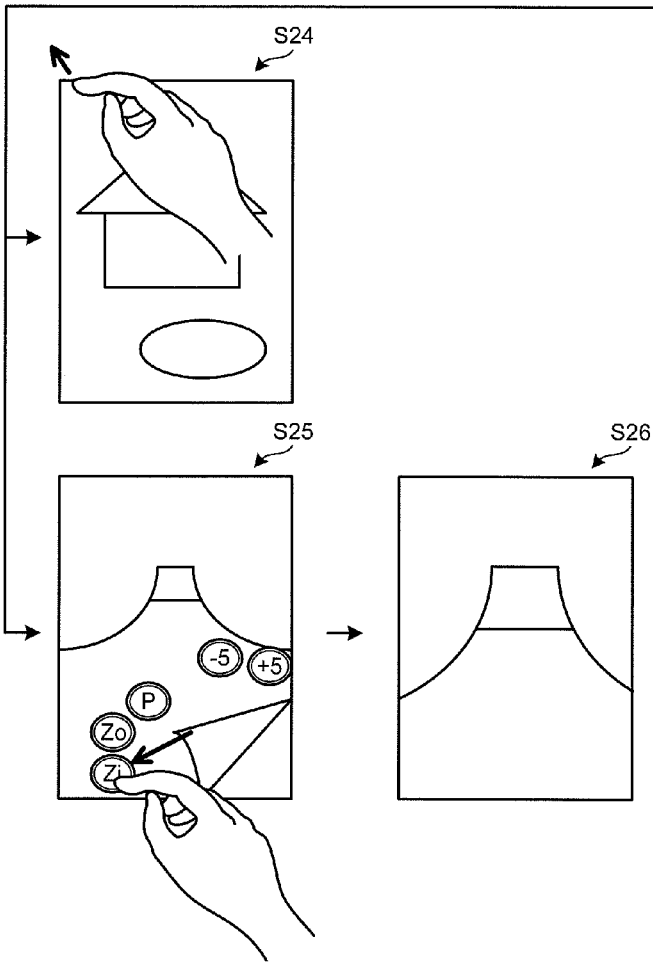

FIG.5

| SCREEN NAME | PROCESS NAME | SYMBOL CHARACTER | CALLED PROCESS |
|---|---|---|---|
| STANDBY SCREEN | SELECT MODE | S | select_mode () |
| | TO THIRD PAGE TO RIGHT | +3 | shift (+3) |
| | TO THIRD PAGE TO LEFT | -3 | shift (-3) |
| | TO FURTHEST PAGE AT RIGHT | R | goto (1) |
| | TO FURTHEST PAGE AT LEFT | L | goto (11) |
| IMAGE VIEWING SCREEN | PROPERTY DISPLAY | P | show_property () |
| | TO FIFTH SUBSEQUENT IMAGE | +5 | shift (+5) |
| | TO FIFTH PREVIOUS IMAGE | -5 | shift (-5) |
| | ZOOM IN | Zi | zoom_in () |
| | ZOOM OUT | Zo | zoom_out () |
| ... | ... | ... | ... |

9D

FIG.6

| SCREEN NAME | EXCLUSION DIRECTION |
|---|---|
| STANDBY SCREEN | 0° |
| | 180° |
| IMAGE VIEWING SCREEN | 240° |
| ... | ... |

9E

MOBILE ELECTRONIC DEVICE, SCREEN CONTROL METHOD, AND STORAGE MEDIUM STRONG SCREEN CONTROL PROGRAM

This application claims priority from Japanese Application No. 2010-264396, filed on Nov. 26, 2010, the content of which is incorporated by reference herein in its entirety.

BACKGROUND

1. Technical Field

The present invention relates to a mobile electronic device, a screen control method, and a storage medium storing therein a screen control program.

2. Description of the Related Art

Recently, a touch panel is widely used in order to enable an intuitive operation and achieve a compact mobile electronic device without requiring a physically large area for an user interface, such as a keyboard. The electronic devices equipped with a touch panel allocate a specific process to each of operations such as a tap gesture detected by the touch panel. For example, there is a known mobile electronic device which activates a function associated with an icon when a gesture of tapping the displayed icon is detected by the touch panel (for example, Japanese Patent Application Laid-open No. 2009-164794).

However, the touch panel detects merely several kinds of operations such as tapping, flicking, and sweeping. For this reason, there is a limit to the number of processes that can be allocated to the operations detected by the touch panel. Accordingly, it was difficult for the user of the electronic device equipped with the touch panel to activate various kinds of processes by operating the touch panel.

For the foregoing reasons, there is a need for a mobile electronic device, a screen control method, and a storage medium storing therein a screen control program that allow the user to activate various processes by operating the touch panel.

SUMMARY

According to an aspect, a mobile electronic device includes a touch panel and a control unit. The touch panel displays a screen thereon and detects a gesture performed on a surface thereof. When a sweep gesture is detected by the touch panel, the control unit causes an object corresponding to a process, which is executable while the screen is displayed on the touch panel, to be displayed near a position where the sweep gesture is detected on the touch panel.

According to an aspect, a screen control method is performed by a mobile electronic device including a touch panel. The screen control method includes: displaying a screen on the touch panel; detecting a sweep gesture on the touch panel; and displaying an object corresponding to a process, which is executable while the screen is displayed on the touch panel, near a position where the sweep gesture is detected on the touch panel.

According to an aspect, a non-transitory storage medium stores a screen control program executed by a mobile electronic device including a touch panel. When the screen control program is executed, the mobile electronic device execute: displaying a screen on the touch panel; detecting a sweep gesture on the touch panel; and displaying an object corresponding to a process, which is executable while the screen is displayed on the touch panel, near a position where the sweep gesture is detected on the touch panel.

BRIEF DESCRIPTION OF THE DRAWINGS

FIG. 3 is a diagram illustrating an example of screen control executed by a mobile phone terminal during the display of an image viewing screen;

FIG. 5 is a diagram illustrating an example of screen processing data;

FIG. 6 is a diagram illustrating an example of the exclusion direction data;

DETAILED DESCRIPTION

Hereinafter, exemplary embodiments of the present invention will be described in detail with reference to the accompanying drawings. It should be noted that the present invention is not limited by the following description. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone terminal is described as an example of a mobile electronic device, however, the present invention is not limited to mobile phone terminals. Therefore, the present invention can be applied to any type of devices provided with a touch panel, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
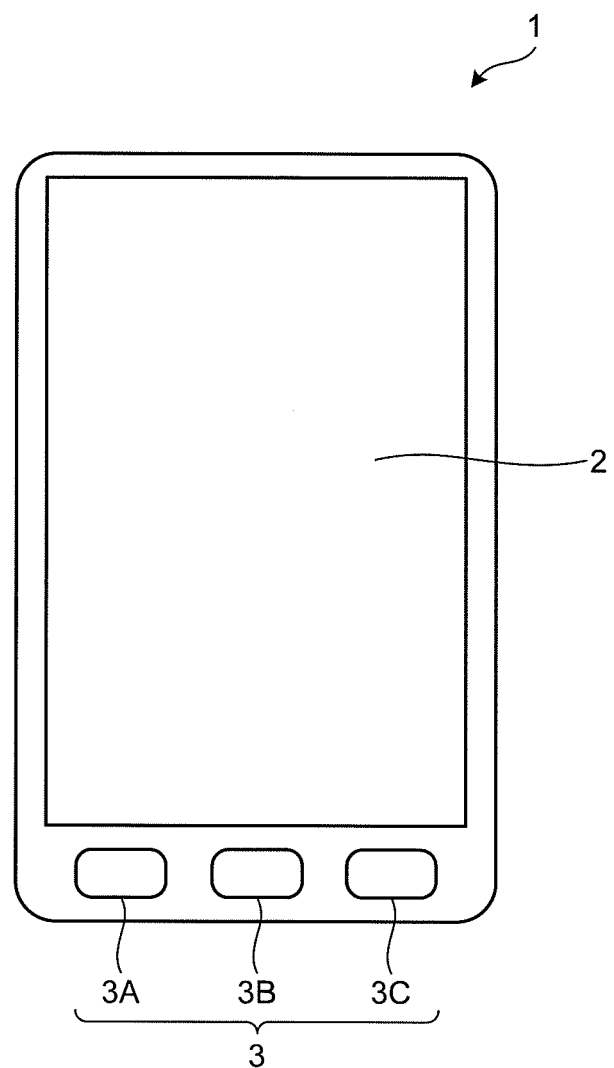
FIG. 1 is a front view illustrating a mobile phone terminal.

First, an overall configuration of a mobile phone terminal 1 according to the first embodiment will be described with reference to FIG. 1. FIG. 1 is a front view illustrating a mobile phone terminal 1. The mobile phone terminal 1 includes a touch panel 2 and an input unit 3 that includes a button 3A, a button 3B, and a button 3C. The touch panel 2 displays characters, diagrams, images, or the like, and detects various kinds of operations (gestures) performed by the user with respect to the touch panel 2 using his/her finger (s), a stylus, a pen, or the like (in the description herein below, for the sake of simplicity, it is assumed that the user touches the touch panel 2 with his/her finger(s)). When any of the buttons is pressed down, mobile phone terminal 1 activates a function associated with the pressed button.

Figure 2:
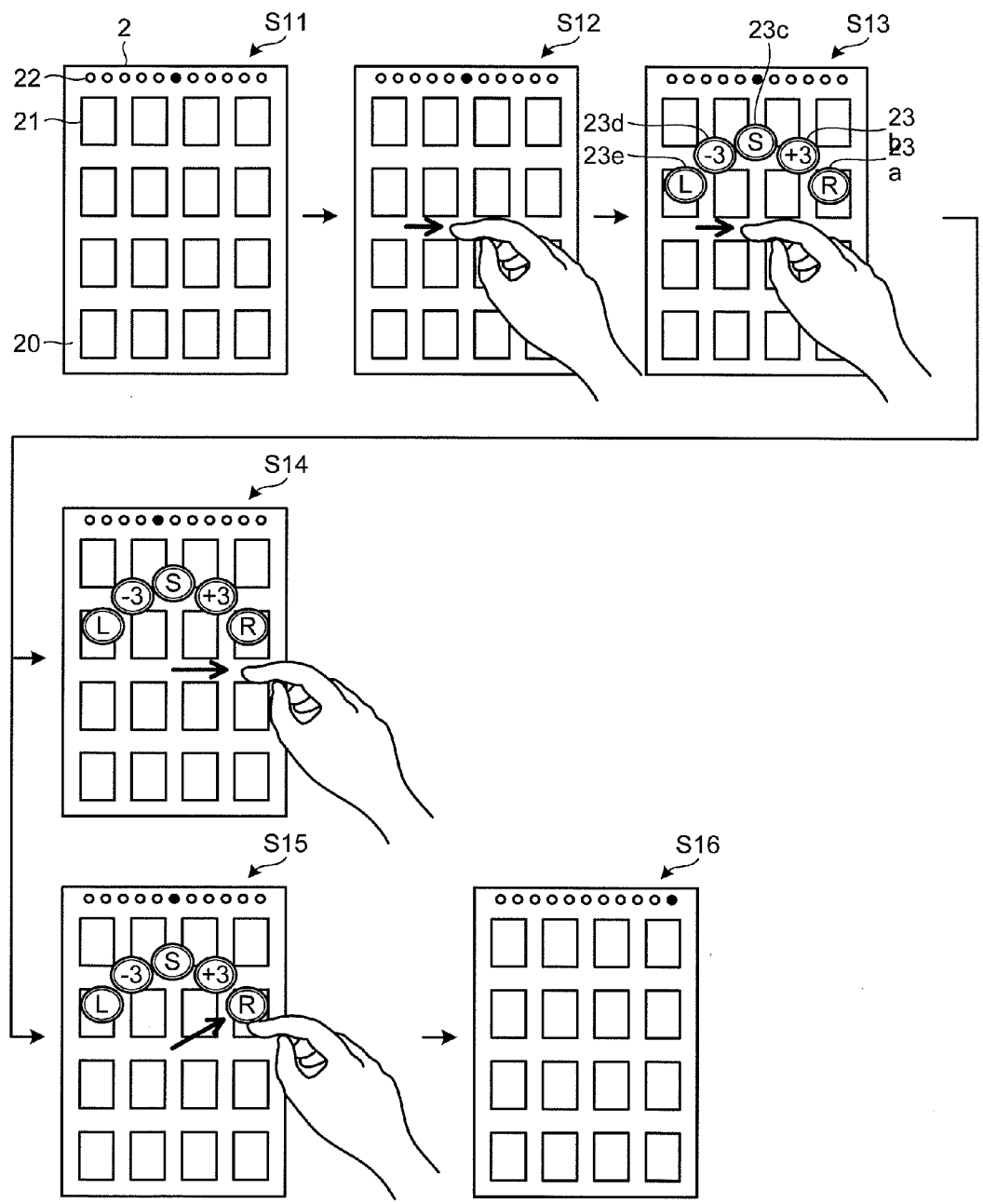
FIG. 2 is a diagram illustrating an example of screen control executed by a mobile phone terminal during the display of a standby screen.

Next, an example of screen control, executed by the mobile phone terminal 1, for designating a process to execute will be described with reference to FIGS. 2 and 3. FIG. 2 is a diagram illustrating an example of screen control executed by the mobile phone terminal 1 during the display of a standby screen. FIG. 3 is a diagram illustrating an example of screen control executed by the mobile phone terminal 1 during the display of an image viewing screen.

Referring to FIG. 2, a standby screen 20 with icons 21 arranged thereon is displayed on the touch panel 2 at step S11. As used herein, a "standby screen" is a screen in a standby state awaiting incoming and outgoing calls, or a screen in a standby state awaiting activation of an application program. In other words, the "standby screen" is a screen displayed before changing to another screen corresponding to any one of various functions provided by the mobile phone terminal 1. The standby screen is sometimes called, for example, "initial screen", "desktop", "home screen", or "wallpaper".

Each of the icons 21 displayed on the standby screen 20 is associated with a specific function. When the user performs a tap gesture with respect to the icon 21, the mobile phone terminal 1 activates the function corresponding to the tapped icon 21. A "tap" refers to a gesture of briefly touching a touch panel or a touch sensor, e.g., with a finger, and releasing the finger therefrom.

An indicator 22 is displayed on an upper portion of the standby screen 20 illustrated in FIG. 2. The indicator 22 indicates a currently displayed page among pages included in the standby screen 20. The standby screen 20 includes eleven pages and is scrolled in a horizontal direction in units of pages. On respective pages of the standby screen 20, different icons 21 may be arranged. At step S11 of FIG. 2, among eleven indicators 22 that are horizontally arranged, the sixth indicator 22 from the right is lighting up. This represents that among pages configuring the standby screen 20, the sixth page from the right is currently being displayed. The number of pages configuring the standby screen 20 is not limited to eleven.

Here, it is assumed that the user starts the sweep gesture with respect to the touch panel 2 at step S12. A "sweep" or "swipe" refers to a gesture of touching a touch panel or a touch sensor, e.g., with a finger, and moving the finger along the touch panel or the touch sensor while keeping the finger touched thereon. When the sweep gesture is detected by the touch panel 2, the mobile phone terminal 1 displays symbols 23a to 23e near a position where the sweep gesture is detected at step S13.

The symbols 23a to 23e are objects corresponding to processes executable during the display of the standby screen 20. The symbol 23a including a character "R" corresponds to a process of scrolling the standby screen 20 up to the furthest right page. The symbol 23b including a character "+3" corresponds to a process of scrolling the standby screen 20 up to the third page to the right. The symbol 23c including a character "S" corresponds to a process of starting a selection mode for selecting a plurality of icons 21 by the tap gesture. The symbol 23d including a character "−3" corresponds to a process of scrolling the standby screen 20 up to the third page to the left. The symbol 23e including a character "L" corresponds to a process of scrolling the standby screen 20 up to the furthest left page.

In the example of FIG. 2, each of the symbols 23a to 23e includes a character representing the associated process but alternatively may include a pictogram instead of a character.

The mobile phone terminal 1 arranges the symbols 23a to 23e in a location excluding a direction of the sweep gesture when displaying the symbols 23a to 23e. When the symbols 23 are arranged in a location excluding the direction of the sweep gesture, it means that the symbols 23 are arranged at least several millimeters (mm) from an imaginary straight line extending in the direction of the sweep gesture with reference to the position where the sweep gesture is detected.

Then, when the sweep gesture is continued in the direction thereof as is, the mobile phone terminal 1 executes a process allocated to the sweep gesture on the currently displayed screen. At step S12, the sweep gesture starts in the direction to the right, and in the standby screen 20, a scroll process of scrolling the standby screen in the direction to the left is allocated to the rightward sweep gesture. Thus, when the sweep gesture is continued in the direction thereof as is, the mobile phone terminal 1 scrolls the standby screen 20 up to the next page to the left at step S14.

Meanwhile, when the user changes the direction of the sweep gesture and comes into contact with any one of the symbols 23a to 23e with the finger after the symbols 23a to 23e are displayed, the mobile phone terminal 1 executes a process corresponding to the contacted symbol 23. For example, when the user changes the direction of the sweep gesture and comes into contact with the symbol 23a with the finger at step S15, the mobile phone terminal 1 scrolls the standby screen 20 up to the furthest right page at step S16.

As described above, the mobile phone terminal 1 displays the symbols 23 corresponding to various kinds of processes executable in the currently displayed screen when the sweep gesture is detected. Then, when any one of the symbols 23 is selected, the mobile phone terminal 1 executes a process corresponding to the selected symbol 23. Thus, the user can execute various processes in the mobile phone terminal 1 by operating the touch panel 2.

In addition, the mobile phone terminal 1 arranges the symbols 23 in a location excluding the direction of the sweep gesture when displaying the symbols 23. Thus, when the user desires to activate a process allocated to the sweep gesture on the currently displayed screen, the user can perform the sweep gesture without coming into contact with the symbol 23 with the finger.

When a specific process is allocated to a sweep gesture in a specific direction in the currently displayed screen, the mobile phone terminal 1 arranges the symbols 23 in a location excluding the specific direction. For example, in the standby screen 20 illustrated in FIG. 2, the scroll process is allocated to the sweep gesture in the horizontal direction, and thus the mobile phone terminal 1 arranges the symbols 23 in a location excluding the horizontal direction of the detected position of the sweep gesture regardless of the direction of the detected sweep gesture. By performing the control in this way, it is possible to suppress the occurrence of a situation in which the symbols 23 become obstacles, making it difficult to activate a process allocated to the sweep gesture in the currently displayed screen.

The control of displaying the symbols corresponding to various kinds of processes executable on the currently displayed screen in response to the detection of the sweep gesture is executed even when a screen other than the standby screen 20 is being displayed. Referring to FIG. 3, an image viewing screen 30 is being displayed on the touch panel 2 at step S21. The image viewing screen 30 refers to a screen that allows the user to view image data.

Here, it is assumed that the user comes into contact with the lower right portion of the touch panel 2 with the finger and starts the sweep gesture in an upper left direction at step S22. In the image viewing screen 30, a process of displaying the next image data is allocated to the sweep gesture from the lower right direction to the upper left direction. The mobile phone terminal 1 performs the controls such that the image data is turned over from the lower right, and next the image data appears from the lower side thereof as at step S23.

In addition, the mobile phone terminal 1 displays symbols 31a to 31e in a location, excluding the direction of the sweep gesture, near the detected position of the sweep gesture.

The symbols 31a to 31e correspond to processes executable during the display of the image viewing screen 30, respectively. The symbol 31a including a character "+5" corresponds to a process of displaying the fifth subsequent image data. The symbol 31b including a character "−5" corresponds to a process of displaying the fifth previous image data. The symbol 31c including a character "Zi" corresponds to a process of zooming in on the image data. The symbol 31d including a character "Zo" corresponds to a process of zooming out on the image data. The symbol 31e including a character "P" corresponds to a process of displaying the attribute (or property) information of the image data.

Then, when the sweep gesture is continued in the direction of the sweeping as is, the mobile phone terminal 1 displays the entire next image data at step S24. When the user changes the direction of the sweep gesture and comes into contact with the symbol 31c with the finger at step S25, the mobile phone terminal 1 zooms in displayed image data at step S26.

Figure 4:
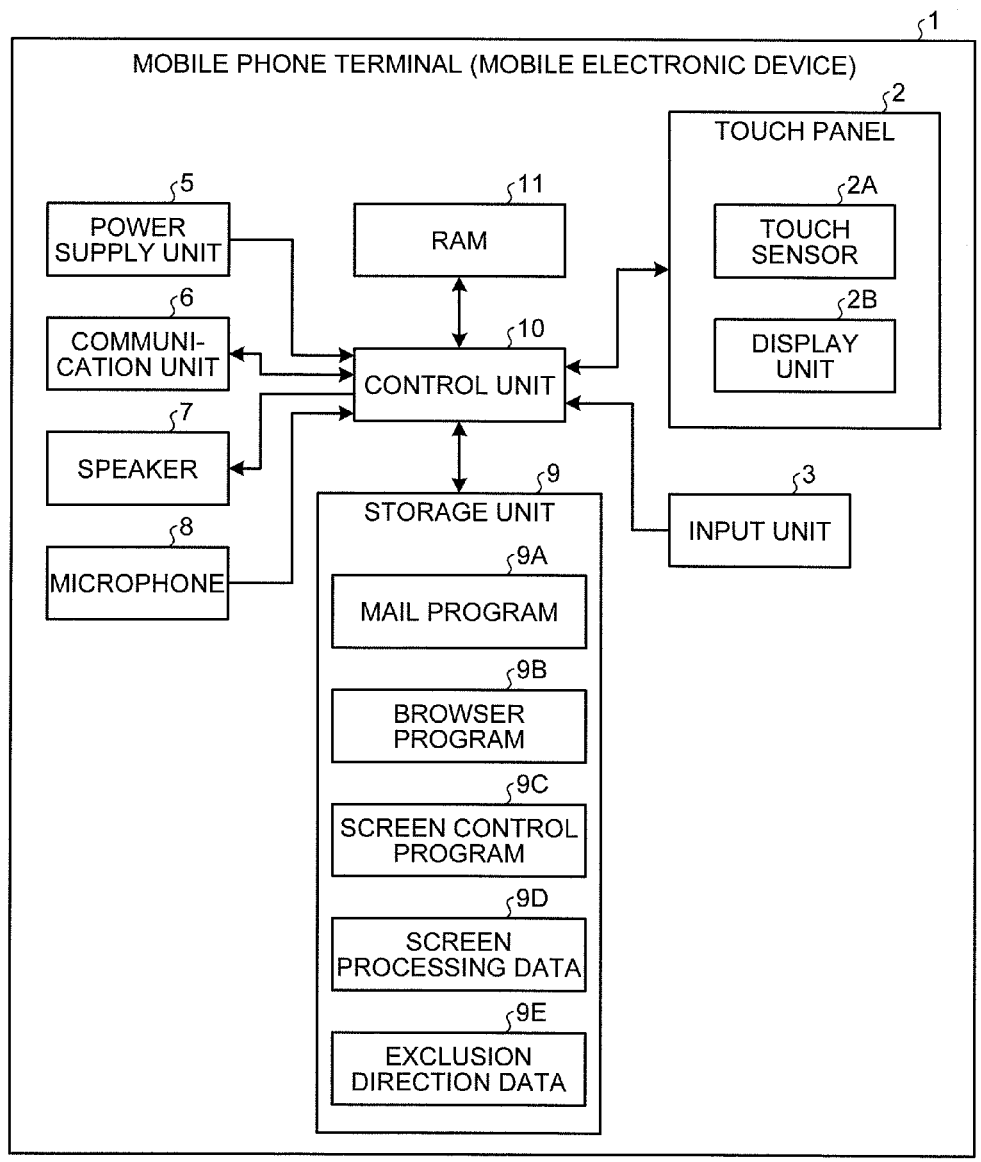
FIG. 4 is a block diagram illustrating a configuration of a mobile phone terminal.

Next, a configuration of the mobile phone terminal 1 will be described with reference to FIG. 4. FIG. 4 is a block diagram illustrating a configuration of the mobile phone terminal 1. The mobile phone terminal 1 illustrated in FIG. 4 includes the touch panel 2, an input unit 3, a power supply unit 5, a communication unit 6, a speaker 7, a microphone 8, a storage unit 9, a control unit 10, and a random access memory (RAM) 11.

The touch panel 2 includes a display unit 2B and a touch sensor 2A overlapped on the display unit 2B. The touch sensor 2A detects various kinds of gestures performed on the touch panel 2 with the fingers as well as the position on the touch panel 2 where the gesture is performed. Examples of a gesture detected by the touch sensor 2A include a tap gesture and a sweep gesture. The touch sensor 2A may employ any type of detection method such as a pressure-sensitive type detection method or a capacitive type detection method. The display unit 2B is configured with, for example, a liquid crystal display (LCD), an organic electro-luminescence (organic EL) panel, or the like and display a character, a diagram, an image, or the like.

The input unit 3 receives the user's operation through a physical button or the like and transmits a signal corresponding to the received operation to the control unit 10. The power supply unit 5 supplies electric power obtained from a battery or an external power supply to each of the function units of the mobile phone terminal 1 including the control unit 10. The communication unit 6 establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 6. The speaker 7 outputs the counterpart's voice during telephone communication, a ring tone, or the like. The microphone 8 converts, for example, the user's voice into an electrical signal.

The storage unit 9 includes one or more non-transitory storage medium, for example, a nonvolatile memory (such as ROM, EPROM, flash card etc.) and/or a storage device (such as magnetic storage device, optical storage device, solid-state storage device etc.).

The storage unit 9 stores therein programs and data used for processes performed by the control unit 10. Specifically, the storage unit 9 stores therein a mail program 9A for implementing the E-mail function, a browser program 9B for implementing the web browsing function, a screen control program 9C for implementing the above described screen control, screen processing data 9D defining processes executable in the displayed screen, and exclusion direction data 9E defining a direction in which symbols are not arranged for each displayed screen. In addition to the above ones, the storage unit 9 stores therein an operating system (OS) program for implementing basic functions of the mobile phone terminal 1, and other programs and data such as address book data in which names, telephone numbers, mail addresses, and the like are registered.

Here, the screen processing data 9D and the exclusion direction data 9E will be described with reference to the drawings. FIG. 5 is a diagram illustrating an example of the screen processing data 9D. As illustrated in FIG. 5, the screen processing data 9D includes items such as Screen Name, Process Name, Symbol Character, and a Called Process. The screen processing data 9D is configured so that a plurality of sets each of which includes Process Name value, Symbol Character value, and Called Process value can be stored in combination with one Screen Name value.

A name of a screen is stored under the item Screen Name. A name of a process executable during the display of the screen is stored under the item Process Name. A character included in a symbol displayed when the sweep gesture is detected during the display of the screen is stored under the item Symbol Character. An internally called procedure for executing a process corresponding to the symbol is stored under the item Called Process.

FIG. 6 is a diagram illustrating an example of the exclusion direction data 6. As illustrated in FIG. 6, the exclusion direction data 9E includes items such as Screen Name and Exclusion Direction, and is configured such that one or more Exclusion Direction values can be stored in combination with one Screen Name value. A name of a screen is stored under the item Screen Name. A direction in which symbols are not arranged during the display of the screen, that is, a direction in which a certain process is allocated to the sweep gesture in the screen is stored under the item Exclusion Direction. The direction is stored, for example, using a clockwise angle on the right of the touch panel 2.

The control unit 10 is, for example, a central processing unit (CPU), and integrally controls the operations of the mobile phone terminal 1. Specifically, the control unit 10 executes the program (s) stored in the storage unit 9 while referring to the data stored in the storage unit 9 as necessary, and executes the various processes by controlling the touch panel 2 the communication unit 6, and the like. The control unit 10 loads the program stored in the storage unit 9 or the data acquired/generated/processed through execution of the processes to the RAM 11 that provides a temporary storage area, as required. The program executed by the control unit 10 and the data to be referred to may be downloaded from a server over wireless communication by the communication unit 6.

For example, the control unit 10 implements the E-mail function by executing the mail program 9A. The control unit 10 executes the screen control program 9C to implement the control, such as the display of the symbols, in response to the sweep gesture as described above.

Next, a processing procedure executed by the control unit 10 based on the screen control program 9C will be described with reference to FIG. 7. The processing procedure illustrated in FIG. 7 is executed each time the sweep gesture is detected.

Figure 7:
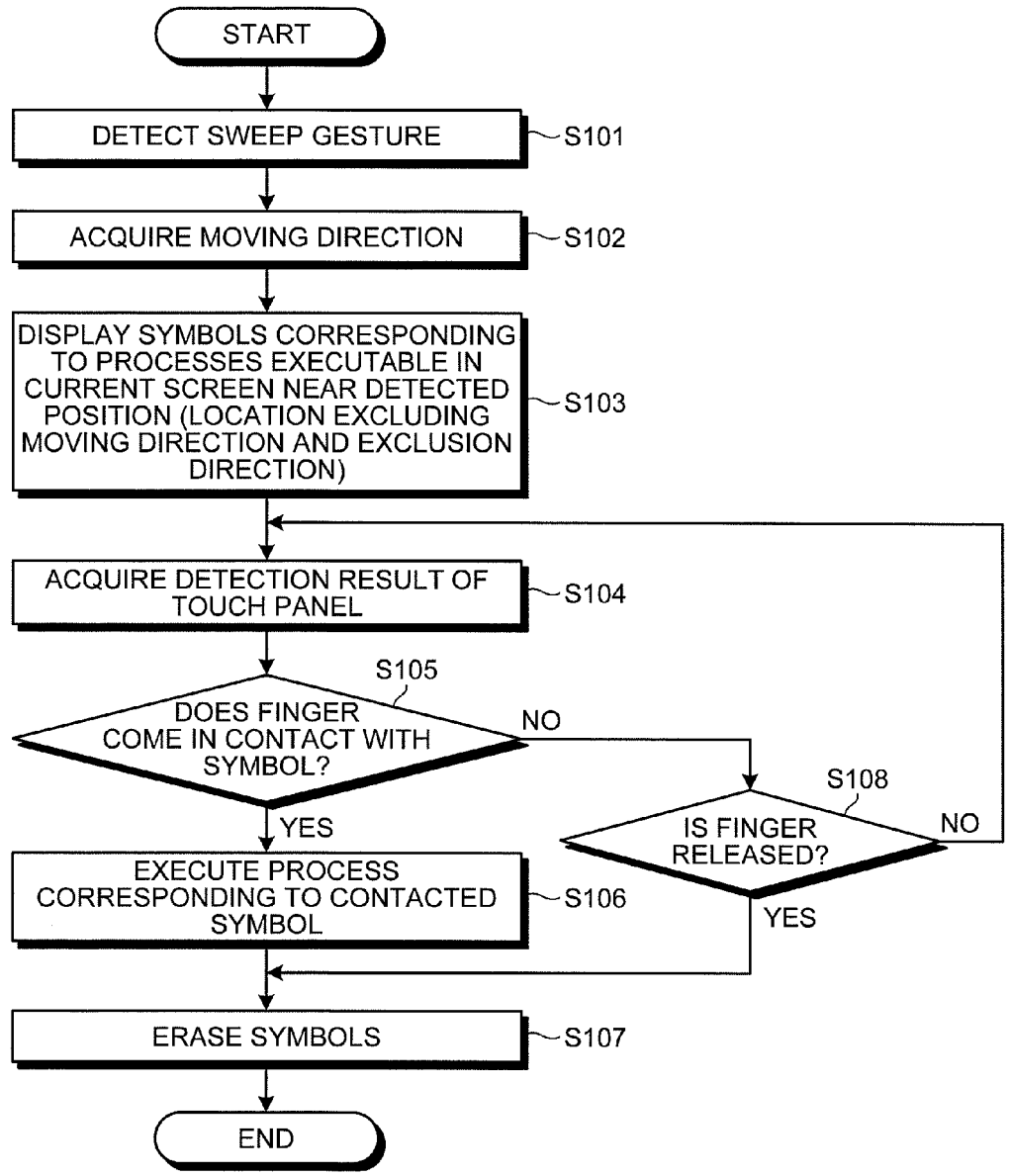
FIG. 7 is a flowchart illustrating a processing procedure executed by a control unit based on a screen control program.

FIG. 7 is a flowchart illustrating a processing procedure executed by the control unit 10 based on the screen control program 9C. As illustrated in FIG. 7, when the sweep gesture is detected by the touch panel 2 at step S101, the control unit 10 acquires the direction of the sweep gesture at step S102.

Then, the control unit 10 acquires information related to processes executable in the currently displayed screen from the screen processing data 9D and displays symbols corresponding to the executable processes near the detected position at step S103. At this time, the control unit 10 arranges the symbols at a location excluding the direction acquired at step S102 and the exclusion direction which is stored in the exclusion direction data 9E in association with the currently displayed screen.

Subsequently, the control unit 10 acquires a new detection result of the touch panel 2 at step S104. When the acquired detection result represents that the user's finger came into contact with anyone of the symbols (Yes at step S105), the control unit 10 executes a process corresponding to the contacted symbol at step S106. Then, the control unit 10 erases the symbols at step S107, and completes the processing procedure which is performed in response to the detection of the sweep gesture.

When the acquired detection result represents that the user's finger has released from the touch panel 2 (No at step S105 and Yes at step S108), the control unit 10 erases the symbols at step S107, and completes the processing procedure which is performed in response to detection of the sweep gesture. When another motion is detected (No at step S108), the control unit 10 re-executes step S104 and the subsequent processes.

As described above, in the present embodiment, the symbols corresponding to the processes executable in the currently displayed screen are displayed in response to detection of the sweep gesture, and thus the user can execute various processes in the mobile phone terminal 1 by operating the touch panel 2.

In the first embodiment, when the user's finger comes in contact with the symbol, the process corresponding to the symbol is executed. However, the process corresponding to the symbol may be executed in response to a change in the direction of the sweep gesture. The second embodiment will be described in connection with an example in which the process corresponding to the symbol is executed in response to a change in the direction of the sweep gesture. A mobile phone terminal 1 according to the second embodiment is configured as illustrated in FIG. 4.

Figure 8:
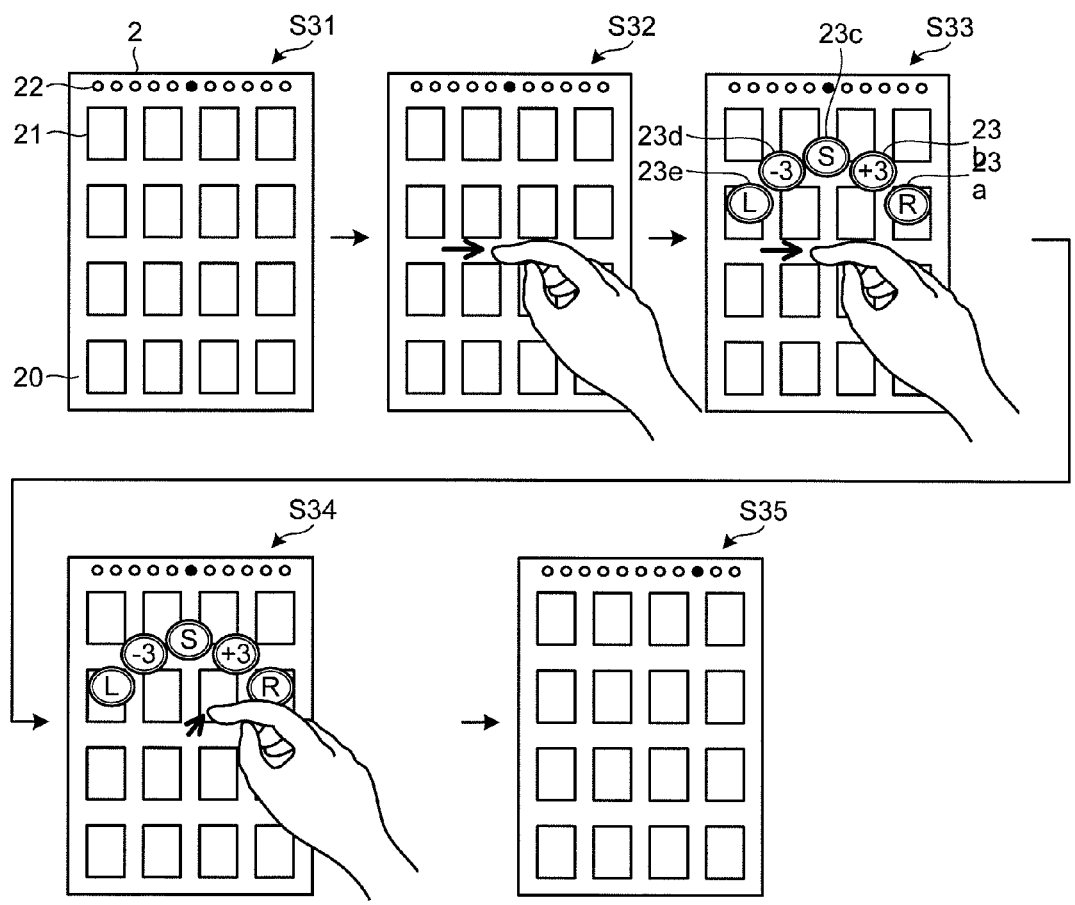
FIG. 8 is a diagram illustrating an example in which a process corresponding to a symbol is executed in response to a change in a direction during a sweep gesture.

FIG. 8 is a diagram illustrating an example in which the process corresponding to the symbol is executed in response to a change in the direction of the sweep gesture. Referring to FIG. 8, the standby screen 20 on which the icons 21 are arranged is displayed on the touch panel 2 at step S31. When the user starts the sweep gesture on the touch panel 2 with the finger at step S32, the mobile phone terminal 1 displays the symbols 23a to 23e near a position where the sweep gesture is detected at step S33.

Here, it is assumed that the user changes the direction of the sweep gesture to the direction of the symbol 23b at step S34.

When the direction of the sweep gesture is changed and the symbol is arranged in the new direction as described above, the mobile phone terminal 1 executes a process corresponding to the symbol. In the case of the example of FIG. 8, the symbol 23b including a character "+3" is arranged in the new direction. Therefore, the mobile phone terminal 1 scrolls the standby screen 20 up to a third page to the right at step S35.

By executing the process corresponding to the symbol in response to a change in the direction of the sweep gesture, the user can execute various processes in the mobile phone terminal 1 by using a smaller amount of operation compared to the first embodiment.

Next, a processing procedure of the control unit 10 when the process corresponding to the symbol is executed in response to a change in the direction of the sweep gesture will be described with reference to FIG. 9. The processing procedure illustrated in FIG. 9 is executed based on the screen control program 9C each time when the sweep gesture is detected.

Figure 9:
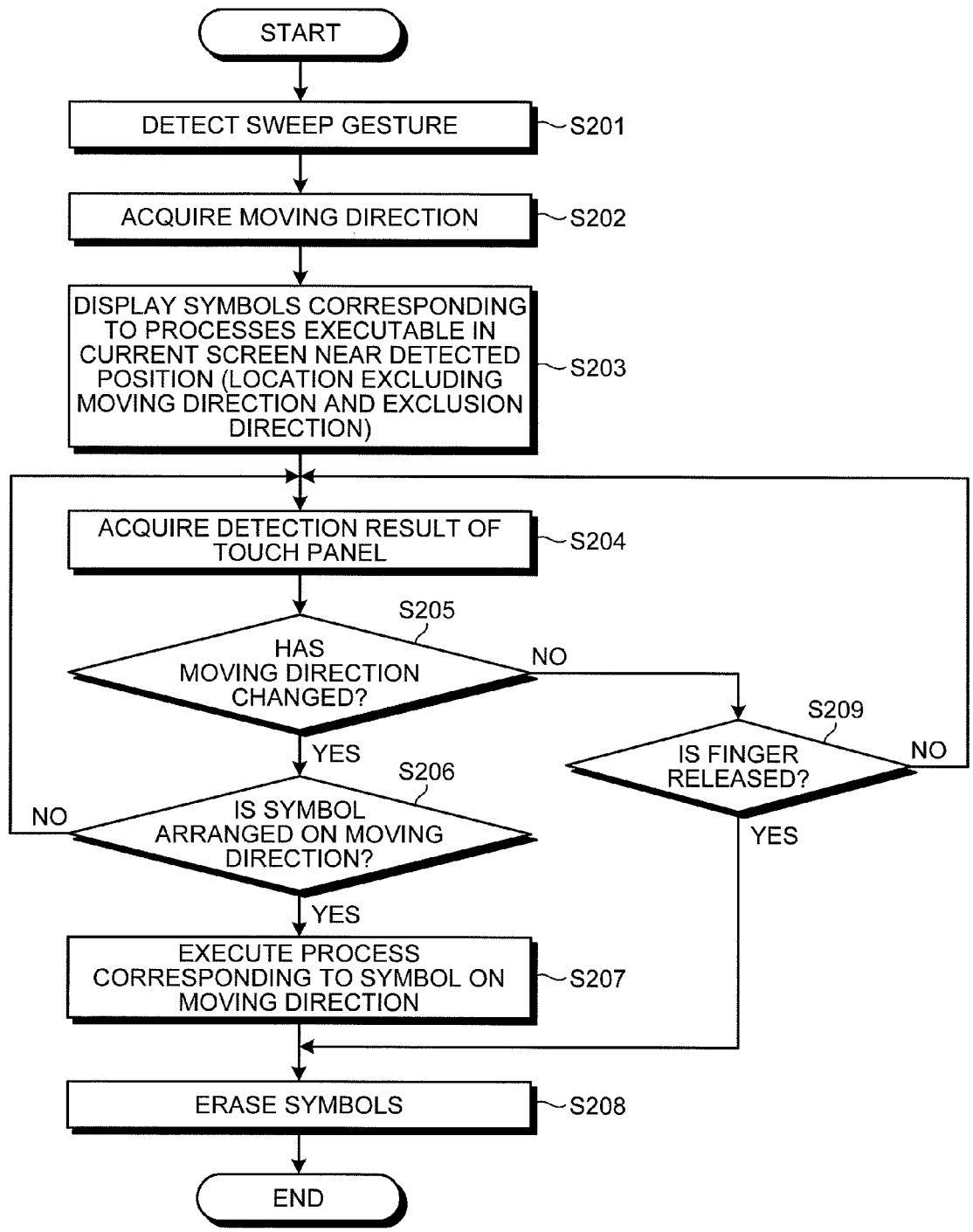
FIG. 9 is a flowchart illustrating a modification of a processing procedure executed by a control unit based on a screen control program.

FIG. 9 is a flowchart illustrating a modification of a processing procedure executed by the control unit 10 based on the screen control program 9C. Referring to FIG. 9, when the sweep gesture is detected by the touch panel 2 at step S201, the control unit 10 acquires the direction of the sweep gesture at step S202.

Then, the control unit 10 acquires information related to processes executable in the currently displayed screen from the screen processing data 9D and displays symbols corresponding to the executable processes near the detected position at step S203. At this time, the control unit 10 arranges the symbols at a location excluding the direction acquired at step S202 and the exclusion direction which is stored in the exclusion direction data 9E in association with the currently displayed screen.

Subsequently, the control unit 10 acquires a new detection result of the touch panel 2 at step S204. When the acquired detection result represents that the direction of the user's sweep gesture has changed (Yes at step S205), the control unit 10 determines whether the symbol is arranged in the new direction at step S206. When the symbol is not arranged in the new direction (No at step S206), the control unit 10 re-executes step S204 and the processes subsequent to step S204.

When the symbol is arranged in the new direction (Yes at step S206), the control unit 10 executes a process corresponding to the symbol in the direction at step S207. Then, the control unit 10 erases the symbols at step S208, and completes the processing procedure which is performed in response to detection of the sweep gesture.

When the acquired detection result represents that the user's finger has released from the touch panel 2 (No at step S205 and Yes at step S209), the control unit 10 erases the symbols at step S208, and completes the processing procedure which is performed in response to detection of the sweep gesture. When another motion is detected (No at step S209), the control unit 10 re-executes step S204 and the subsequent processes.

In the first and second embodiments, the symbols are fixed on the display during a sweep gesture. However, a display location of the symbol may change in response to a change in the direction of the sweep gesture. A third embodiment will be described in connection with an example in which the display location of the symbols changes in response to a change in the direction of the sweep gesture. A mobile phone terminal 1 according to the second embodiment is configured as illustrated in FIG. 4.

Figure 10:
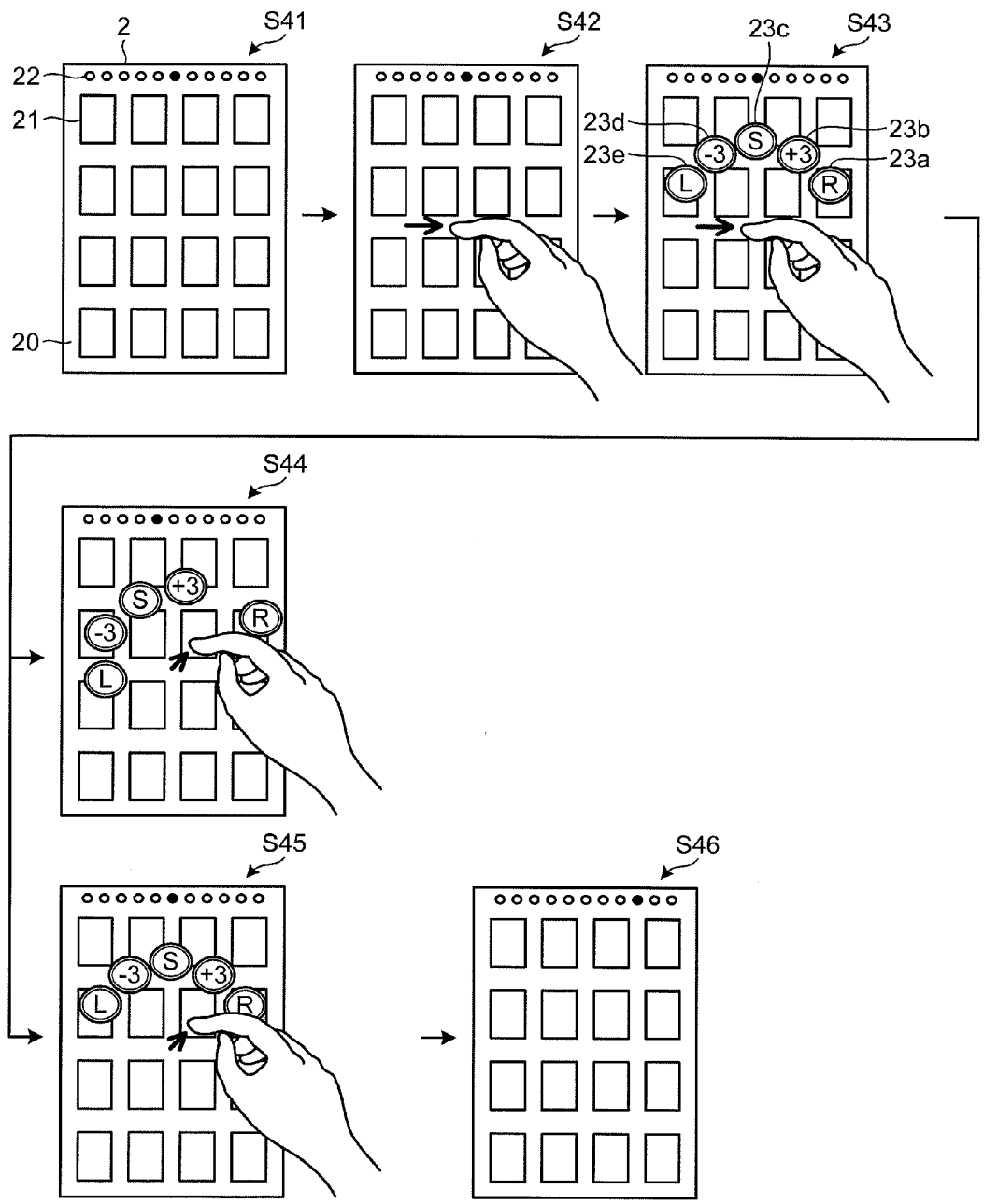
FIG. 10 is a diagram illustrating an example in which a display location of symbols changes in response to a change in a direction during a sweep gesture.

FIG. 10 is a diagram illustrating an example in which the display location of the symbols changes in response to a change in the direction of the sweep gesture. Referring to FIG. 10, the standby screen 20 on which the icons 21 are arranged is displayed on the touch panel 2 at step S41. When the user starts the sweep gesture on the touch panel 2 with the finger at step S42, the mobile phone terminal 1 displays the symbols 23a to 23e near a position where the sweep gesture is detected at step S43.

Here, it is assumed that the user changes the direction of the sweep gesture to the direction of the symbol 23b. When the finger's movement acceleration at the time of a change in the direction is below a predetermined threshold value, the mobile phone terminal 1 arranges the symbols 23a to 23e, in a location excluding the new direction, near the detected position of the sweep gesture at step S44.

By re-arranging the symbols 23a to 23e at a location excluding the new direction each time when the direction of the sweep gesture changes as described above, the user can perform an operation on an arbitrary object displayed on the screen without being disturbed by the symbols 23a to 23e. For example, the operation on the arbitrary object may be a gesture of touching any one of icons 21 for a long time and activating a process associated with a long tap of the icon 21. A "long tap" refers to a gesture of consecutively touching a touch panel or a touch sensor, e.g., with a finger, and releasing the finger therefrom.

Meanwhile, when the finger's movement acceleration at the time of a change in the direction is above a predetermined threshold value, the mobile phone terminal 1 executes a process corresponding to the symbol 23b on the new direction without moving the symbols 23a to 23e at step S45. In the case of the example of FIG. 10, the symbol 23b including a character "+3" is arranged in the new direction. Therefore, the mobile phone terminal 1 scrolls the standby screen 20 up to a third page to the right at step S46.

By moving the finger toward any one of the symbols at abrupt acceleration, the user can activate the processing corresponding to the symbol without moving the symbols.

Next, a processing procedure of the control unit 10 when a display location of the symbols is changed in response to a change in the direction of the sweep gesture will be described with reference to FIG. 11. The processing procedure illustrated in FIG. 11 is executed based on the screen control program 9C each time when the sweep gesture is detected.

Figure 11:
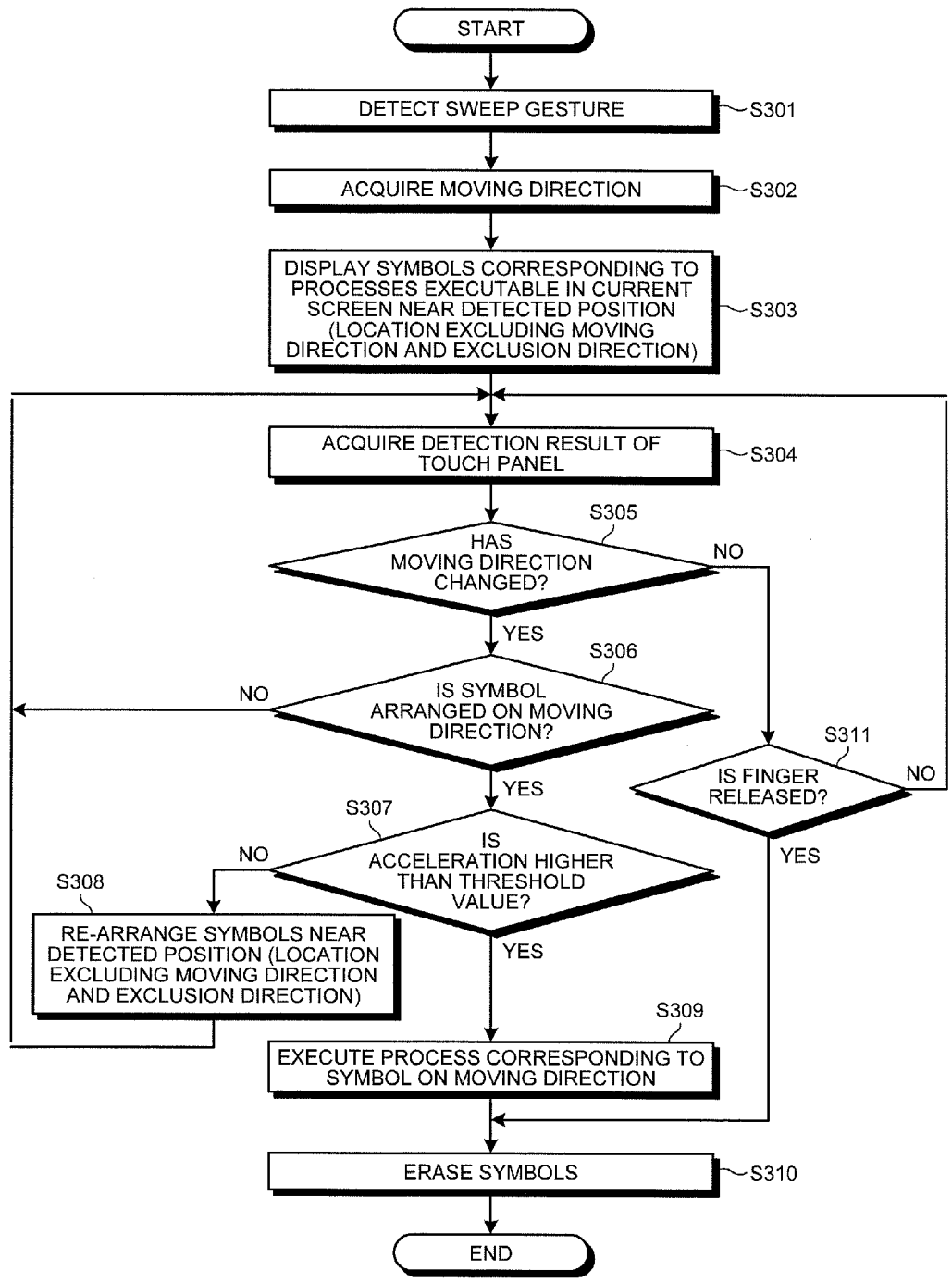
FIG. 11 is a flowchart illustrating another modification of a processing procedure executed by a control unit based on a screen control program.

FIG. 11 is a flowchart illustrating another modification of a processing procedure executed by the control unit 10 based on the screen control program 9C. As illustrated in FIG. 11, when the sweep gesture is detected by the touch panel 2 at step S301, the control unit 10 acquires the direction of the sweep gesture at step S302.

Then, the control unit 10 acquires information related to processes executable in the currently displayed screen from the screen processing data 9D and displays the symbols corresponding to the executable processes near the detected position at step S303. At this time, the control unit 10 arranges the symbols at a location excluding the direction acquired at step S302 and the exclusion direction which is stored in the exclusion direction data 9E in association with the currently displayed screen.

Subsequently, the control unit 10 acquires a new detection result of the touch panel 2 at step S304. When the acquired detection result represents that the direction of the user's sweep gesture has changed (Yes at step S305), the control unit 10 determines whether the symbol is arranged in the new direction at step S306. When the symbol is not arranged in the new direction (No at step S306), the control unit 10 re-executes step S304 and the processes subsequent to step S304.

When the symbol is arranged in the new direction (Yes at step S306), the control unit 10 determines whether the finger's movement acceleration at the time of a change in the direction is above a predetermined threshold value at step S307. When the acceleration is not above the threshold value (No at step S307), the control unit 10 re-arranges the symbols at a location, excluding the exclusion direction and the new direction, near the detected position at step S308. Then, the control unit 10 re-executes step S304 and the processes subsequent to step S304.

When the acceleration is above the threshold value (Yes at step S307), the control unit 10 executes a process corresponding to the symbol on the new direction at step S309. Then, the control unit 10 erases the symbols at step S310, and completes the processing procedure that is performed in response to detection of the sweep gesture.

Meanwhile, when the acquired detection result represents that the user's finger has released from the touch panel 2 (No at step S305 and Yes at step S311), the control unit 10 erases the symbols at step S310, and completes the processing procedure that is performed in response to detection of the sweep gesture. When another motion is detected (No at step S311), the control unit 10 re-executes step S304 and the subsequent processes.

The aspects of the embodiments can be arbitrarily changed without departing from the spirit and the scope of the present invention. For example, the screen control program 9C may be separated into a plurality of modules or may be integrated with other programs.

In the above embodiments, the symbols displayed in response to detection of the sweep gesture are erased when the user's finger has released from the touch panel 2. However, the symbols may be displayed even after the finger is released from the touch panel 2. In this case, when the symbol is tapped, a process corresponding to the tapped symbol may be executed, and when a portion on the touch panel 2A other than the symbols is tapped, the symbols may be erased.

Figure 12:
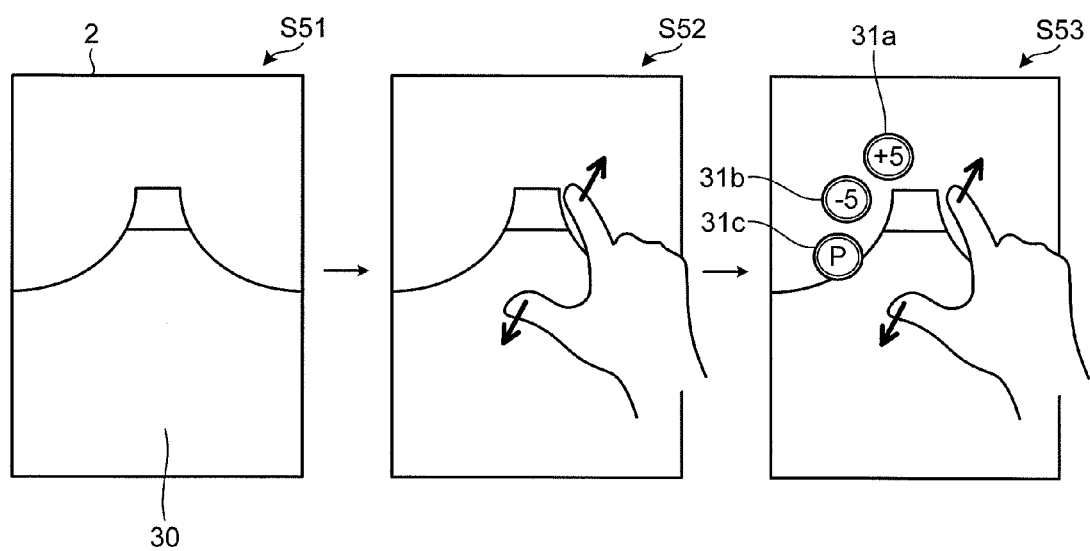
FIG. 12 is a diagram illustrating an example of a display state of symbols when a sweep gesture is performed with a plurality of fingers.

In the above embodiments, the symbols are displayed when the sweep gesture is performed with one finger. However, the symbols may be displayed when the sweep gesture is performed with a plurality of fingers. This case will be described with reference to FIG. 12. FIG. 12 is a diagram illustrating an example in which the symbols are displayed when the sweep gesture is performed with a plurality of fingers. Referring to FIG. 12, the image viewing screen 30 is displayed on the touch panel 2 at step S51.

At step S52, the user comes in contact with the touch panel 2 with two fingers and performs the sweep gesture such that the two fingers move further away from each other. This operation is called a pinch gesture, and in the image viewing screen 30, this operation is associated with a process of zooming in image data. When the sweep gesture is performed with a plurality of fingers, the mobile phone terminal 1 displays symbols 31a, 31b, and 31c corresponding to processes executable in the currently displayed screen at a location excluding the directions of the respective sweep gestures at step S53. Then, for example, when any one of the fingers comes into contact with the symbol, the mobile phone terminal 1 executes a process corresponding to the symbol. When the sweep gesture is continued as is, the currently displayed image data is zoomed in.

The advantages are that one embodiment of the invention provides a mobile electronic device, a screen control method, and a storage medium storing therein a screen control program that allow the user to activate various processes by operating the touch panel.

What is claimed is:

1. A mobile electronic device, comprising:
a touch panel configured to display at least one screen thereon and to detect a gesture performed on a surface thereof; and
a control unit configured to cause, when a sweep gesture is detected by the touch panel, at least one object corresponding to at least one process, which is executable while the screen is displayed on the touch panel, to be displayed
adjacent a position where the sweep gesture to a first direction is detected on the touch panel,
but not at a location in the first direction of the sweep gesture from the position where the sweep gesture is detected,
wherein
the control unit is further configured to execute,
when the touch panel detects that the same sweep gesture is continued in the same first direction and the object is displayed on the screen, a process not corresponding to the displayed object, and
when the first direction of the sweep gesture is changed, at an acceleration above a threshold value, to a second direction toward the object, the process corresponding to the object.

2. The mobile electronic device according to claim 1,
wherein the control unit is configured to execute, when the position where the sweep gesture is detected comes in the object, the process corresponding to the object.

3. The mobile electronic device according to claim 1,
wherein the control unit is configured to change, when the first direction of the sweep gesture is changed, at an acceleration less than the threshold value, to the second direction, a position where the object is displayed so that the object is displayed
adjacent the position where the sweep gesture is detected,
but not at a location in the second direction of the sweep gesture from a position where the first direction of the sweep gesture is changed to the second direction.

4. The mobile electronic device according claim 1,
wherein the at least one screen includes multiple screens,
wherein the touch panel is configured to detect a sweep gesture to a third direction,
wherein the control unit is configured to cause the object to be displayed
adjacent a position where the sweep gesture to the third direction is detected,
but not at a location in the third direction from the position where the sweep gesture to the third direction is detected, and
wherein the third direction is determined for each screen among the multiple screens displayed on the touch panel.

5. The mobile electronic device according claim 4,
wherein the third direction determined for each screen among the multiple screens displayed on the touch panel is a scroll direction of said screen.

6. The mobile electronic device according to claim 1,
wherein the control unit is configured to cause the object to be erased when the process corresponding to the object is executed.

7. The mobile electronic device according to claim 1,
wherein the control unit is configured to cause the object to be erased when a portion on the touch panel other than the object is tapped.

8. The mobile electronic device according claim 1,
wherein the control unit is configured to cause, when multiple sweep gestures are detected by the touch panel, the object to be displayed
adjacent corresponding positions where the multiple sweep gestures are detected,
but not at locations in corresponding directions of the multiple sweep gestures from the corresponding positions where the multiple sweep gestures are detected.

9. A screen control method performed by a mobile electronic device including a touch panel, the method comprising:
displaying at least one screen on the touch panel;
detecting a sweep gesture on the touch panel;
displaying at least one object corresponding to at least one process, which is executable while the screen is displayed on the touch panel,
adjacent a position where the sweep gesture to a first direction is detected on the touch panel,
but not at a location in the first direction of the sweep gesture from the position where the sweep gesture is detected;
executing, when the touch panel detects that the same sweep gesture is continued in the same first direction and the object is displayed on the screen, a process not corresponding to the displayed object; and
executing, when the first direction of the sweep gesture is changed at an acceleration above a threshold value to a second direction toward the object, the process corresponding to the object.

10. The screen control method according to claim 9, further comprising executing, when the position where the sweep gesture is detected comes in the object, the process corresponding to the object.

11. The screen control method according to claim 9, further comprising changing, when the first direction of the sweep gesture is changed, at an acceleration less than the threshold value, to the second direction, a position where the object is displayed so that the object is displayed
adjacent the position where the sweep gesture is detected,
but not at a location in the second direction of the sweep gesture from a position where the first direction of the sweep gesture is changed to the second direction.

12. The screen control method according to claim 9,
wherein the at least one screen includes multiple screens,
wherein the detecting includes detecting a sweep gesture to a third direction,
wherein the displaying includes displaying the object
adjacent a position where the sweep gesture to the third direction is detected,
but not at a location in the third direction from the position where the sweep gesture to the third direction is detected, and
wherein the third direction is determined for each screen among the multiple screens displayed on the touch panel.

13. The screen control method according to claim 12,
wherein the third direction determined for each screen among the multiple screens displayed on the touch panel is a scroll direction of said screen.

14. A non-transitory storage medium that stores a screen control program for causing, when executed by a mobile electronic device including a touch panel, the mobile electronic device to execute:
displaying at least one screen on the touch panel;
detecting a sweep gesture on the touch panel;

displaying at least one object corresponding to at least one process, which is executable while the screen is displayed on the touch panel,
- adjacent a position where the sweep gesture to a first direction is detected on the touch panel,
- but not at a location in the first direction of the sweep gesture from the position where the sweep gesture is detected;

executing, when the touch panel detects that the sweep gesture is continued in the first direction and the object is displayed on the screen, a process not corresponding to the displayed object; and executing, when the first direction of the sweep gesture is changed, at an acceleration above a threshold value, to a second direction toward the object, the process corresponding to the object.

\* \* \* \* \*